March 10, 1964 O. D. GRANDSTAFF ETAL 3,124,786

ELECTRONIC INTERRUPTER

Filed July 7, 1960 2 Sheets-Sheet 1

INVENTOR.
Otho D. Grandstaff
William A. Alden
BY C. A. Gulbrandsen
Atty.

ELECTRONIC INTERRUPTER

INVENTOR.
Otho D. Grandstaff
William A. Alden
BY C. A. Gulbrandsen
Atty.

United States Patent Office 3,124,786

Patented Mar. 10, 1964

3,124,786

ELECTRONIC INTERRUPTER

Otho D. Grandstaff, Oak Park, and William A. Alden, St. Charles, Ill., assignors to Automatic Electric Laboratories, Inc., Northlake, Ill., a corporation of Delaware Filed July 7, 1960, Ser. No. 41,416
10 Claims. (Cl. 340—174)

This invention relates to an interrupter, and more particularly, the invention relates to an electronic interrupter which is static in operation, and which is capable of providing, for example, the control pulses for the various signal interruptions employed in telephone systems for interrupting the ringing signals, busy signals, timing signals and the like.

In present day telephone systems control pulses for providing these various interruptions are usually generated by a motor driven cam type interrupter, such as for example the one disclosed by Lomax et al., U.S. Patent 2,385,715, issued September 25, 1945. These interrupters are normally common equipment to the exchange and failure of the interrupter equipment would cause stoppage of all calls through an exchange. As an assurance that these pulses will be available, duplicate interrupters are nearly always furnished. An interrupter may be operated on a start-stop basis, in which case it starts operating when the first call is originated and continues to operate as long as there is any traffic. In larger exchanges, the interrupter may run continuously, and run approximately 5 million revolutions per year. Interrupters of this type where the number of operations is very large often require excessive maintenance. For applications of equipment where the number of operations is very large or the speed is high, electronic equipment will provide more satisfactory operation than electro-mechanical equipment.

It is therefore the principal object of this invention to provide a new and novel electronic interrupter which is static in operation, and which is capable of providing some or all of the control pulses for the various signal interruptions employed in a telephone system for interrupting the ringing signals, the busy signals, timing signals and the like.

It is a further object of this invention to provide an electronic interrupter wherein the control pulses for providing the various interruptions may be changed with a very minimum amount of effort.

In the electronic interrupter of this invention the above mentioned objects are accomplished by selectively threading output windings each preferably containing only a single turn through a plurality of magnetic cores which are operatively connected to progressively advance an applied signal through each of the magnetic cores in succession at an established repetition rate. In the embodiment of the invention disclosed herein one output winding for each series of control pulses for a particular sequence of interruptions desired is selectively threaded through the magnetic cores. The addition of, the elimination of, or the changing of any series of control pulses for providing any particular sequence of interruptions may be accomplished simply by selectively threading, or removing, or selectively rethreading, respectively, one output winding through the proper magnetic cores to derive the series of control pulses for the particular sequence of interruptions desired.

In order to control the progression of signals through the magnetic cores the invention employs a transistorized oscillator which generates precision square wave pulses of one quarter second duration, operating at two cycles per second. The oscillator has two output terminals and all of the even numbered ones of the magnetic cores are connected to one of the output terminals while all of the odd numbered ones of the magnetic cores are connected to the other one. The oscillator controls the progression of the signal through the magnetic cores by alternately applying a positive and a negative square wave pulse to each of the two output terminals, respectively. A diode in the coupling network is either blocked or unblocked by these pulses to allow the signal to be advanced or held.

The invention also employs a second transistorized oscillator which generates a five thousand cycle square wave voltage and has a dual function of serving as a source of power for the magnetic cores and for driving the transistor switches connected to the output windings thereof. The frequency of this oscillator need not be precise since it only functions as a source of power.

The invention, both as to its organization and method of operation, together with other objects and features not specifically, mentioned, will best be understood by reference to the following specification taken in connection with the accompanying drawings.

Figure 1:
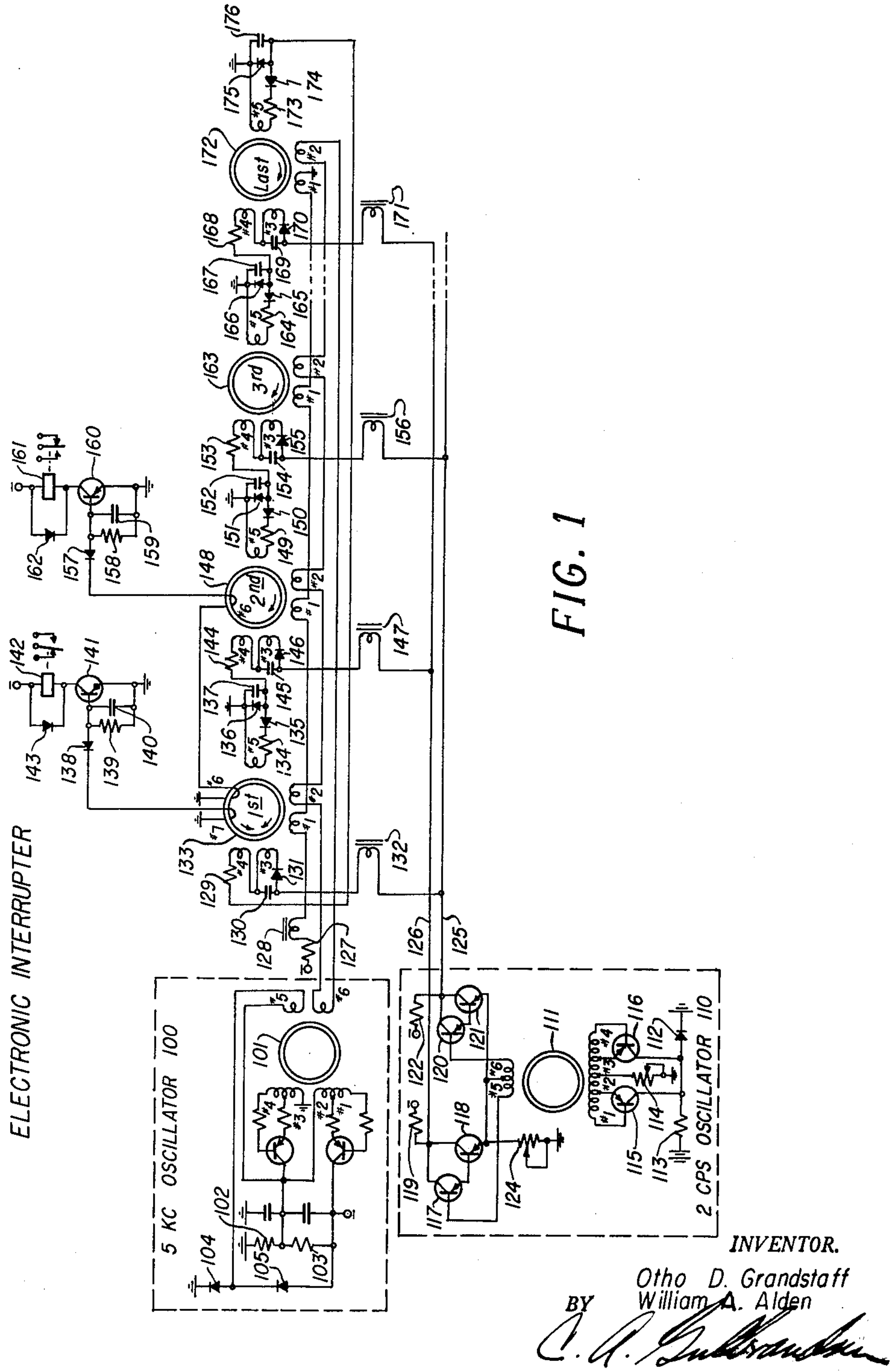
FIGURE 1 is the schematic diagram of an electronic interrupter.

Referring now to FIGURE 1 which shows the electronic interrupter of this invention. It comprises as its principal components a five thousand cycle per second oscillator 100, including magnetic core 101, which serves as a source of power for the magnetic cores 133, 148, 163 and 172, and for driving the transistor switches, for example, transistor switches shown comprising transistors 141 and 160; a two cycle per second oscillator 110, including magnetic core 111 and transistors 115–118 and 120—121, which serves to generate precision pulses for controlling the magnetic cores; a plurality of magnetic cores, only four of which are shown for simplicity sake, preferably of magnetic material characterized by a substantially rectangular hysteresis loop, connected in tandem and arranged to progressively advance a signal through each of the magnetic cores in succession under control of the two cycle per second oscillator 10; and output windings, such as for example, winding #7 on magnetic core 133 and winding #6 threaded through both magnetic cores 133 and 148, selectively threaded through a number of magnetic cores to derive an output signal therefrom in accordance with the selective threading as a signal is progressively advanced through the magnetic cores.

An electronic interrupter having a six second program requires 24 magnetic cores such as magnetic cores 133, 148, 163 and 172, and an interrupter having an 8 second program requires 32 of these magnetic cores. Furthermore, any other length of program may be used that requires an even number of these magnetic cores.

*Description of Operation*

The operation of the system is essentially as follows. All of the magnetic cores 133, 148, 163 and 172 are initially, completely saturated by current flow from ground through the #1 winding on each of the respective magnetic cores, through the choke coil 128, resistor 127 to battery. One magnetic core at a time is unsaturated by current flowing through its #4 winding. Note that each magnetic core has an arrow indicating clockwise direction of flux associated with its #1 winding. Magnetic core 133 is shown with an arrow associated with its #4 winding showing counter-clockwise flow of flux. Resistors 129, 144, 153 and 168 are provided to adjust the current flow through the #4 windings to produce sufficient ampere turns to neutralize the flux due to the #1 windings. Neutralizing the flux causes, for example, magnetic core 133 to be unsaturated; allowing it to function as a transformer. Alternating current power from the #6 winding of the 5 kc. oscillator 100 impresses a substantial voltage on the #2 winding of magnetic core 133 while a very small voltage exists across the #2 winding on all of the other magnetic cores; since these cores are completely saturated and the impedance of their #2 windings is very low. The higher voltage on the #2 winding of magnetic core 133 induces voltages in all of the windings of this magnetic core. Voltage from the single turn output winding #7 is rectified by diode 138 to charge capacitor 140 negatively with respect to ground. This negative potential applied to the base of transistor 141 causes it to be completely conducting causing current to flow through relay 142, operating it. In a similar manner, current from winding #6 of magnetic core 133 flows through the low impedance winding #6 of magnetic core 148 through diode 157 to charge capacitor 159. The negative potential on capacitor 159 controls transistor 160 to cause current to flow through the winding of relay 161, operating it. Both relays 142 and 161 are operated during the period magnetic core 133 is unsaturated. At the end of the first pulse period, magnetic core 133 is caused to be resaturated and magnetic core 148 unsaturated. Voltage is no longer induced in the windings of magnetic core 133 and the charge on capacitor 140 dissipates through resistor 139 causing transistor 141 to switch to the off condition causing relay 142 to release. Diode 143 shunted across the winding of relay 142 prevents a high voltage surge induced in its winding from damaging transistor 141 when relay 142 releases. Now, with magnetic core 148 unsaturated, voltage induced in the #6 winding of magnetic core 148 causes current to flow from ground, through the lower impedance winding #6 of magnetic core 133, and through diode 157 to keep capacitor 159 charged. This keeps transistor 160 conducting and relay 161 operated. Thus with the output windings threaded through magnetic cores 133 and 148 as shown in FIGURE 1, relay 142 will be operated during one pulse period and relay 161 will be operated during two consecuetive pulse periods, for each program of pulses.

Additional single turn output windings can be laced through the magnetic cores in a similar manner to control other relays to operate in any desired combination of pulses. For example, in an electronic interrupter having 24 cores and using ¼ second pulse periods, a single turn output winding can be laced through 8 consecutive magnetic cores to cause a relay to be operated 2 seconds and be released 4 seconds to provide a ringing period of 2 seconds on and 4 seconds off. Another output winding can be threaded through every other magnetic core to cause a relay to be alternately operated and released on consecutive ¼ second periods to provide interruptions for 120 impulses per second busy signals. Additional output windings can be threaded through the magnetic cores to provide code ringing for party line stations and, also, to cause relays to pulse in precisely synchronized relationship to other pulses provided by the electronic interrupter. FIGURES 3–12 show a chart indicating a number of the various interruptions required in a telephone system, and the magnetic cores through which the single turn output windings must be selectively threaded to derive the control pulses for providing these interruptions.

Progression of pulses through the successive magnetic cores is caused in the following manner. The 2 c.p.s. oscillator 110 is used to generate precision pulses or square waves of ¼ second duration for each half cycle. In oscillator 110, the time of a half cycle depends on the inductance of its #2 or #3 winding and the voltage applied. The voltage to oscillator 110 is held very constant due to the voltage regulator diode 112 connected through resistor 113 to battery, even though the battery potential may vary between wide limits. During ½ cycle current flows from ground through resistor 114, winding #2 of magnetic core 111, and transistor 115 to the negative potential on the voltage regulator diode 112. The induced voltage in winding #1 of magnetic core 111 maintains a negative potential on transistor 115, keeping it highly conductive, until the magnetic core suddenly saturates. After saturation, no voltage is induced in winding #1 and the base of transistor 115 becomes of the same potential as its emitter; causing it to be nonconductive. Current flow in the #2 winding of magnetic core 111 ceases and flux in the magnetic core collapses causing reverse voltages to be induced in the windings. The base of transistor 115 becomes more positive than its emitter keeping transistor 115 cutoff and the voltage induced in winding #4 of magnetic core 111 makes the base of transistor 116 negative with respect to its emitter; causing it to be switched on. Current now flows from ground, through resistor 114, winding #3 of magnetic core 111 and transistor 116 to the negative potential on voltage regulator diode 112. When current in the #3 winding of magnetic core 111 causes the magnetic core to saturate in the opposite direction, voltage is no longer induced in winding #4 of magnetic core 111 and transistor 116 is switched off to stop current flow through winding #3 of magnetic core 111. Decay of flux in the magnetic core 111 induces a voltage in winding #1 of magnetic core 111 to cause transistor 115 to conduct again to start the next cycle of oscillation. With windings #2 and #3 of magnetic core 111 being wound to the same number of turns, their inductances are equal and the time of successive half cycles are equal, inducing symmetrical half cycles of square wave alternating current in windings #5 and #6 of magnetic core 111. Resistor 114 provides a frequency control. The frequency is increased by decreasing resistor 114.

The output of the 2 c.p.s. oscillator 110 controls leads 125 and 126 to make them alternately positive or negative, i.e.; first lead 125 is near ground potential and lead 126 is near negative battery potential and during the next pulse lead 126 is near ground potential and lead 25 is near negative battery potential. When winding #6 of magnetic core 111 is negative transistor 120 is made fully conductive and it causes transistor 121 to be fully conductive, connecting lead 125 through transistor 121 and resistor 124 to ground. At the same time, the positive voltage of winding #5 of magnetic core 111 causes transistor 117 to be nonconductive and it in turn causes transistor 118 to be nonconductive, leaving lead 126 connected through resistor 119 to negative battery. During the next half cycle these conditions are reversed. The lead 125 is connected to the #3 and #4 windings of the odd numbered ones of the magnetic cores and the lead 126 is connected to the #3 and #4 windings of the even numbered ones of the magnetic cores.

The 5 kc. oscillator 100 functions in a similar manner to the 2 c.p.s. oscillator 110 except that no voltage regulator is required for its source of voltage. Its frequency is of no importance but it must apply substantial A.C. power to energize the windings of all of the magnetic cores and to drive the transistor switches connected to the output windings thereof. It uses power transistors; each operating from half the battery voltage provided by the voltage dividing resistors 102 and 103. Voltages are maintained equal across resistors 102 and 103 by means of winding #5 of magnetic core 101 and diodes 104 and 105. Winding #6 of magnetic core 101 delivers approximately 5 kc. square wave oscillations to the #2 windings of all of the magnetic cores, for example, magnetic cores 133, 148, 163 and 172.

When the lead 125 is near ground potential and the lead 126 near battery potential, the negative potential on lead 126 applied to diodes 146, 170, etc. associated with the windings of the even numbered ones of the magnetic cores prevents current flow through the #3 and #4 windings of these magnetic cores due to the polarization of the diodes. This makes unsaturation of the even numbered magnetic cores, for example 148 and 172, impossible during this period. Positive potential on lead 125 applied to diodes 131, 155, etc. of the odd numbered magnetic cores provides a possibility of any of these magnetic cores becoming unsaturated due to current flowing through their #3 and #4 windings. The circuit is self starting because one of the magnetic cores will unsaturate more readily than the others. Assuming this to be magnetic core 133, the 5 kc. alternating current on its #2 winding will induce a voltage in its #3 winding; winding #3 is termed a battery eliminator winding for reasons which will be apparent from the description that follows. This voltage will be rectified by diode 131 to charge capacitor 130 to produce a source of d.c. potential. This potential will cause current to flow through the #4 winding of magnetic core 133, resistor 129, diode 175 to ground; and from ground through resistor 124 to capacitor 130. Ampere turns produced in the #4 winding of magnetic core 133 causes a flux opposing the flux produced by the #1 winding of magnetic core 133. Magnetic core 133 becomes unsaturated and its #2 winding induces substantial voltage in its other windings for the duration of the positive condition on the lead 125. It may also be noted that the battery eliminator winding #3 also provides a self-adjusting feature for the unsaturated magnetic cores. That is, the A.C. signal flow through the #4 windings of the magnetic cores may result in an overshoot of flux which instead of merely opposing the flux due to the bias of the #1 windings might tend to saturate the magnetic core in the opposite magnetic state. If this should tend to happen the signal induced in the #3 battery eliminator winding will be less and the resulting current flow through the #4 winding from the charging of the capacitor 130, for example, will also decrease. This will compensate for the overshoot and the flux will be decreased to equal the flux due to the bias. The second magnetic core 148 is prepared for operation next in the following manner. Voltage induced in the #5 winding of magnetic core 133 causes current to flow through resistor 134 and the diode 135 to charge capacitor 137 negatively with respect to ground. The charge on capacitor 137 is of lower potential than the negative battery voltage connected to lead 126 at this time. At the beginning of the next cycle of the 2 c.p.s. oscillator 110 the lead 125 becomes connected to negative battery through resistor 122 and the lead 126 becomes connected to ground through transistor 118 and resistor 124. The negative potential on lead 125 prevents further flow of current through diode 131, causing current flow through the #4 winding of magnetic core 133 to stop; resulting in magnetic core 133 becoming resaturated. With lead 126 now being more positive, a charge on capacitor 137 causes current to flow to ground and from ground through resistor 124, through transistor 118, over lead 126, through inductor 147, through diode 146, windings #3 and #4 of magnetic core 148, and resistor 144, to capacitor 137. This current is momentary but is effective in providing ampere turns in the #4 winding of magnetic core 148; causing it to become unsaturated. In this condition its #2 winding induces voltages in the #3 winding, causing current to flow through diode 146 to charge capacitor 145. The charge on capacitor 145 causes current to continue to flow through winding #4 of magnetic core 148 to maintain ampere turns in the #4 winding after capacitor 137 has become discharged and throughout the duration of this pulse period. Other even numbered magnetic cores, such as the last magnetic core 172, do not become unsaturated because their associated capacitors, such as 176, have no priming charge. During this period, winding #2 of magnetic core 148 induces a voltage in winding #5 to charge capacitor 152 in preparation for operating magnetic core 163 as an unsaturated transformer in a succeeding pulse period. In this manner, at the end of each pulse period, a magnetic core becomes saturated and its succeeding magnetic core becomes unsaturated to function as a transformer. While functioning as a transformer, voltages are induced in all of its windings including any single turn winding used to control the operation of the interrupter relays, for example, interrupter relays 142 and 161.

Figure 2:
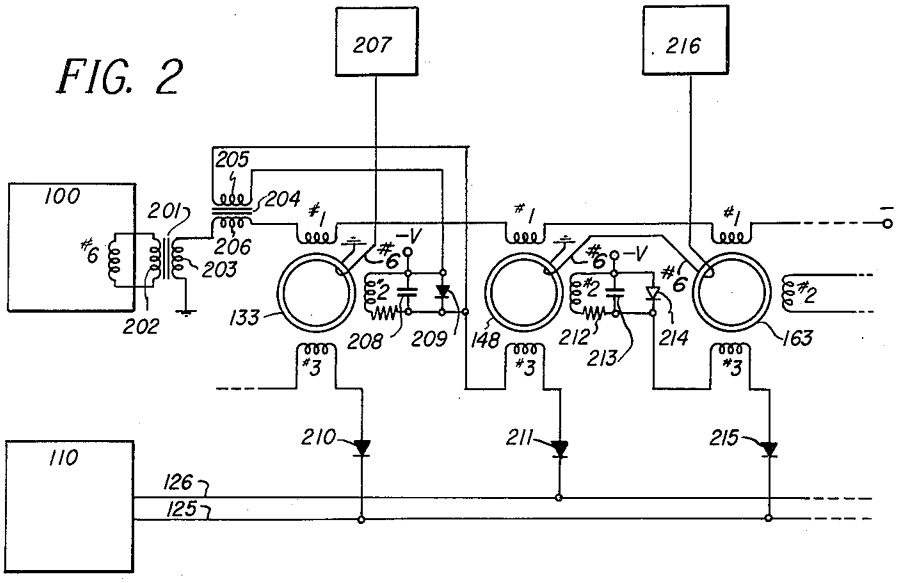
FIGURE 2 shows an alternate method of operating the magnetic cores.

Referring now to FIGURE 2 which shows an alternate method of operation. In FIGURE 2 the components which are the same as those of FIGURE 1 are numbered the same as in FIGURE 1. In FIGURE 2, all of the magnetic cores, only magnetic cores 133, 148 and 163 are shown for simplicity, are completely saturated by current flowing from ground, through winding 203 of transformer 201, winding 206 of transformer 204, through the #1 windings on each of the magnetic cores, to battery; thus it may be observed that the 5 kc. oscillator 100 serves to bias the magnetic cores as well as being a source of power to drive the magnetic cores and the transistor switches. One magnetic core at a time is unsaturated by the ampere turns on winding #2 on each of the magnetic cores. When each of the magnetic cores are unsaturated, the output of the 5 kc. oscillator 100 impressed on winding 202 of transformer 201 is applied to the #1 winding on each of the magnetic cores, and is induced in the winding #3 and all other windings on the magnetic cores including any single turn output winding laced through the magnetic cores. The magnetic cores are unsaturated in sequence as follows. In the beginning when all of the magnetic cores are completely saturated, all of the #1 windings are very low impedance and cause the 5 kc. output of oscillator 100 to be impressed on the low impedance primary winding 205 of transformer 204. The output of transformer 204 is rectified by diode 209, for example, causing a charge to accumulate on capacitor 208. The 2 c.p.s. oscillator 110 produces a square wave voltage as previously described. When a negative cycle occurs, for the lead 126, the negative pulse plus the charge accumulated on capacitor 208 is greater than the bias voltage connected to diode 209 and capacitor 208. Therefore, these voltages cause a current to flow through diode 209, the #3 winding of magnetic core 148, diode 211, over lead 126 to oscillator 110 and ground. This current is sufficient to unsaturate magnetic core 148. Its #1 winding becomes higher impedance causing most of the 5 kc. voltage to appear across it instead of the primary of transformer 204. The charge on capacitor 208 lasts only a few milliseconds but voltage induced in winding #3 of magnetic core 148 rectified by diodes 209 and 211 is added to the negative pulse of the 2 c.p.s. oscillator 110 to cause magnetic core 148 to continue to be unsaturated. Voltage is also induced in the #2 winding of magnetic core 148 which causes current to flow through resistor 212, capacitor 213, and diode 214. Rectification by diode 214 causes a charge to be stored on capacitor 213 to prepare the next core for operation. Magnetic core 148 remains in the unsaturated state and voltage induced in the #6 output winding laced through the magnetic core controls the pulse gate 216 in the manner previously described; until the voltage of the 2 c.p.s. oscillator 110 reverses at the end of a ¼ second period. When the voltage on lead 126 becomes positive with respect to ground which makes the potential on diode 211 so positive that current through winding #2 of magnetic core 148 stops. Magnetic core 148 becomes resaturated and the voltage on lead 125 now being negative causes magnetic core 163 to become unsaturated in the same manner previously described for magnetic core 148.

Figures 3, 4, 5, 6, 7, 8, 9, 10, 11, 12, 13:
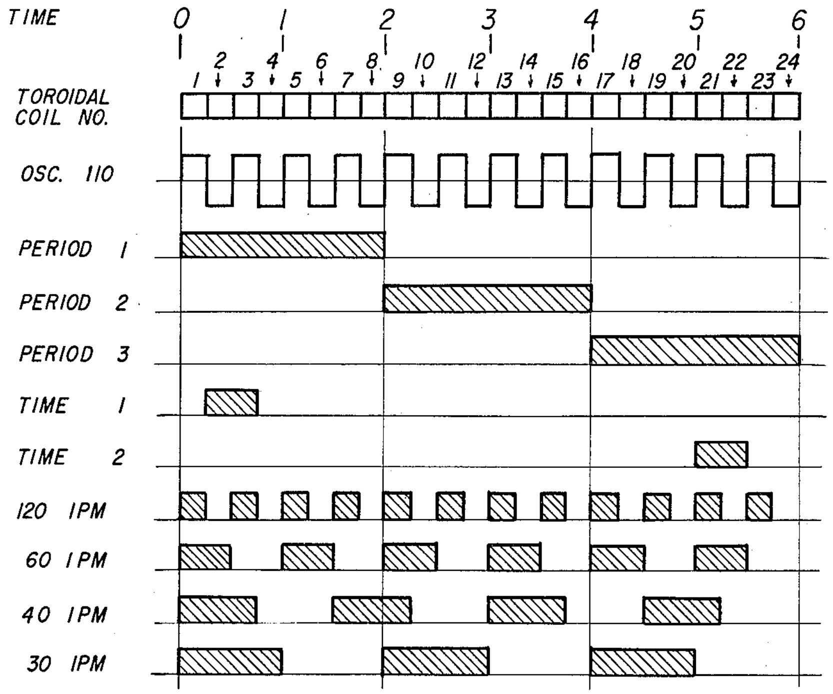
FIGURES 3–13 are tables showing the various interruptions employed in a telephone system and the magnetic cores through which the output windings must be selectively threaded to derive them.

Referring now to FIGURES 3–13 which show a number of the various interruptions employed in a telephone system. In FIGURE 4 is shown the output of the 2 c.p.s. oscillator 110 used to progressively advance the signal through each of the magnetic cores. FIGURE 3 represents 24 of the described magnetic cores employed in an electronic interrupter as disclosed by this invention having a 6 second program. FIGURES 5–13 show in block form the various magnetic cores through which the single turn output windings must be selectively threaded in order to derive the various interruptions. Thus, in FIGURE 5 for example, it is shown that 1 single turn output winding must be selectively threaded through magnetic cores 1–8 consecutively in order to derive interrupter period number 1 having a two second interruption. In FIGURE 10 it is shown that the familiar 120 i.p.m. interruptions employed in a telephone system may be derived from the magnetic cores by selectively threading an additional single turn output winding through every other one of the magnetic cores, consecutively. Also in FIGURE 13 the familiar 30 i.p.m. interruptions employed in a telephone system are shown derived from the magnetic cores by selectively threading an additional single turn output winding through magnetic cores numbered 1–4, 9–12 and 17–20 consecutively.

FIGURES 5–13 are not intended to be inclusive of all of the various interruptions which may be derived from the electronic interrupter of this invention but are included only as an example of a number of the various interruptions employed in a telephone system which may be derived from the electronic interrupter. It will be obvious to anyone skilled in the art that any number of output windings may be selectively threaded in any one of a plurality of different patterns to derive control pulses for providing any desired series of interruptions, or for synchronizing pulses, or for providing timing pulses without departing from the true spirit and scope of the invention.

What is claimed is:

1. An interrupter for providing electrical impulses of various lengths at various intervals comprising: a plurality of magnetic cores of substantially rectangular hysteresis loop material, each having a plurality of windings; signal generating means for applying a signal to a winding on at least one of said magnetic cores, said plurality of windings including an input winding and an advance winding; coupling means individually connecting the advance winding of one of said magnetic cores with the input winding on a succeeding magnetic core, said coupling means enabling said signal to be progressively advanced through each of said magnetic cores in succession; one output winding selectively threaded through a plurality of said magnetic cores, other output windings selectively threaded through different numbers of said magnetic cores, each of said output windings having an output signal magnetically induced therein in accordance with the number of cores through which it is selectively threaded as said signal is progressively advanced through said magnetic cores.

2. An interrupter for providing electrical impulses of various lengths at various intervals comprising: a plurality of magnetic cores of substantially rectangular hysteresis loop material, each having a plurality of windings; signal generating means for applying a signal to a winding on at least one of said magnetic cores, said plurality of windings including an input winding and an advance winding; coupling means individually connecting the advance winding of one of said magnetic cores with the input winding on a succeeding magnetic core, said coupling means enabling said signal to be progressively advanced through each of said magnetic cores in succession; biasing means connected to one of said windings on on each of said magnetic cores, said biasing means producing a flux biasing said magnetic cores in a magnetic state of saturation rendering said magnetic cores inoperative to advance said signal; one output winding selectively threaded through a plurality of said magnetic cores, other output windings selectively threaded through different pluralities of said magnetic cores, each of said output windings having an output signal magnetically induced therein in accordance with the number of cores through which said winding is selectively threaded as said signal is progressively advanced through said magnetic cores.

3. An interrupter for providing electrical impulses of various lengths at various intervals comprising: a plurality of magnetic cores of substantially rectangular hysteresis loop material, each having a plurality of windings; signal generating means for applying a signal to a winding on at least one of said magnetic cores, said plurality of windings including an input winding and an advance winding; coupling means individually connecting the advance winding of one of said magnetic cores with the input winding on a succeeding magnetic core, said coupling means enabling said signal to be progressively advanced through each of said magnetic cores in succession; biasing means connected to one of said windings on each of said magnetic cores, said biasing means producing a flux biasing said magnetic cores in a magnetic state of saturation rendering said magnetic cores inoperative to advance said signal; control means connected to one of said windings on each of said magnetic cores for selectively controlling the magnetic state of saturation of said magnetic cores; one output winding selectively threaded through a plurality of said magnetic cores, other output windings selectively threaded through different numbers of said magnetic cores, each of said output windings having an output signal magnetically induced therein in accordance with the number of magnetic cores through which that winding is selectively threaded as said signal is progressively advanced through said magnetic cores under control of said control means.

4. An interrupter as claimed in claim 3, wherein said control means comprises an oscillator having a first and a second output terminal and including means for alternately applying pulses of a predetermined duration and at a predetermined repetition rate to each of said output terminals, said first output terminal being connected to one of said windings on each of the odd numbered ones of said magnetic cores and said second output terminal being connected to one of said windings on each of the even numbered ones of said magnetic cores, said oscillator controlling the magnetic state of saturation of said magnetic cores by alternately applying said pulses to said first and said second output terminals to thereby progressively advance said signal through each of said magnetic cores at said repetition rate.

5. An interrupter for providing electrical impulses of various lengths at various intervals comprising: a plurality of magnetic cores of substantially rectangular hysteresis loop material operable as transformers, each having a plurality of windings, including input, advance, and bias windings, connected thereto; a plurality of coupling means, including signal storage means, each connecting said advance winding on one of said magnetic cores to said input winding on a second one of said magnetic cores to form a continuous series chain of magnetic cores; biasing means connected to said bias winding on each of said magnetic cores, said biasing means being operative to produce a flux biasing said magnetic cores in a magnetic state of saturation rendering said magnetic cores inoperative as transformers; signal generating means operative to apply a signal to one of said windings on each of said magnetic cores, said signal being magnetically induced in the other of said windings on said magnetic cores only when said magnetic cores are functioning as transformers; one output winding selectively threaded through a plurality of said magnetic cores, other output windings selectively threaded through different numbers of said magnetic cores, each of said output windings having a signal magnetically induced therein varying in length in accordance with the number of magnetic cores through which said winding is selectively threaded as said signal is progressively advanced through said magnetic cores.

6. An interrupter as claimed in claim 5, wherein there is further provided control means having a first and a second output terminal and including means for alternately applying pulses of a predetermined duration and at a predetermined repetition rate to each of said output terminals, respectively, said first output terminal being connected to said input winding on each of the odd numbered ones of said magnetic cores and said second output terminal being connected to said input windings on each of the even numbered ones of said magnetic cores, said control means being operative to selectively cause a signal stored in said signal storage means to flow through said input winding to produce a flux opposing said flux produced by said biasing means to cause said magnetic cores to function as transformers to thereby progressively advance said signal through each of said magnetic cores in accordance with the repetition rate of said signals applied to said output terminals.

7. An interrupter as claimed in claim 6, wherein said signal storage means is a capacitor, the discharge of which produces a momentary current flow through said input winding to produce a flux opposing the flux produced by said biasing means to thereby cause said magnetic cores to function as transformers to magnetically induce said signal from said signal generating means in each of the other of said windings on said magnetic cores.

8. An interrupter as claimed in claim 6, wherein there is further provided flux self-adjusting means connected between said input winding on each of said magnetic cores and the corresponding one of said output terminals of said control means, said flux self-adjusting means operated to maintain a predetermined flux resulting from said signal flow in said input winding in said unsaturated magnetic cores to maintain said magnetic cores in an unsaturated state under control of said control means.

9. An interrupter as claimed in claim 6, wherein there is further provided a battery eliminator winding on each of said odd numbered ones of said magnetic cores serially connected between said input winding and said first output terminal of said control means and on each of said even numbered ones of said magnetic cores and said second output terminal of said control means; rectifier means serially connected between each of said battery eliminator windings and the respective one of said output terminals of said control means; and a capacitor connected across each of said battery eliminator windings and said rectifier means whereby said signal from said signal generating means induced in said battery eliminator winding is rectified by said rectifier means to charge said capacitor to thereby maintain a signal flow through said input windings when said signal stored in said signal storage means is dissipated.

10. A signal generator for providing signals which may be varied in time and duration comprising: a plurality of magnetic cores of substantially rectangular hysteresis loop material, each having a plurality of windings; signal generating means for applying a signal to a winding on at least one of said magnetic cores, said plurality of windings including a signal input, a signal advance and a signal output winding; coupling means individually connecting said signal advance winding on one of said magnetic cores with said signal input winding on a succeeding magnetic core, said coupling means enabling said signal to be progressively advanced through each of said magnetic cores in succession; control means connected to said signal input winding on each of said magnetic cores for controlling the advancement of said signal through said magnetic cores; and means serially connected between said signal input winding on each of said magnetic cores and said control means for maintaining a signal flow through said signal input winding allowing a signal to be magnetically induced in said output winding during the time said signal is flowing in said signal input winding, said means comprising a battery eliminator winding having a rectifier serially connected therewith and a capacitor bridging said battery eliminator winding and said rectifier such that a signal from said signal generating means induced in said battery eliminator winding is rectified to charge said capacitor to maintain current flow in said input winding.

References Cited in the file of this patent

UNITED STATES PATENTS

| | | |
|---|---|---|
| 2,803,812 | Rajchman et al. | Aug. 20, 1957 |
| 2,835,241 | Vaughan | May 20, 1958 |